June 23, 1970

H. H. VERMETTE 3,516,304

SAFETY CATCH MECHANISM

Filed Sept. 12, 1968

INVENTOR
HOWARD H. VERMETTE

BY Benjamin Schlosser
ATTORNEY

June 23, 1970  H. H. VERMETTE  3,516,304
SAFETY CATCH MECHANISM
Filed Sept. 12, 1968  3 Sheets-Sheet 2

INVENTOR
HOWARD H. VERMETTE

BY Benjamin Schlosser
ATTORNEY

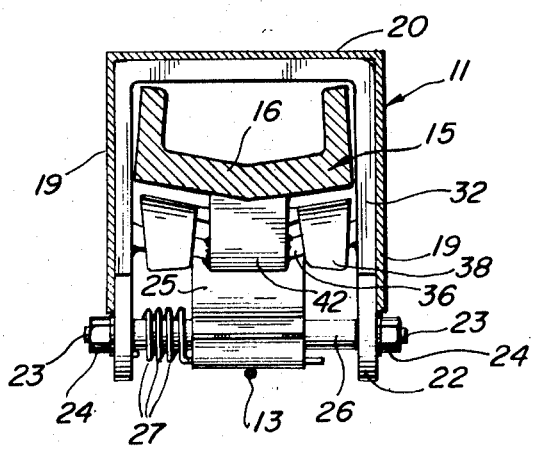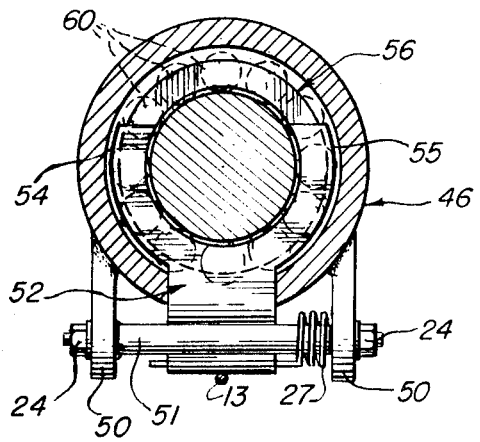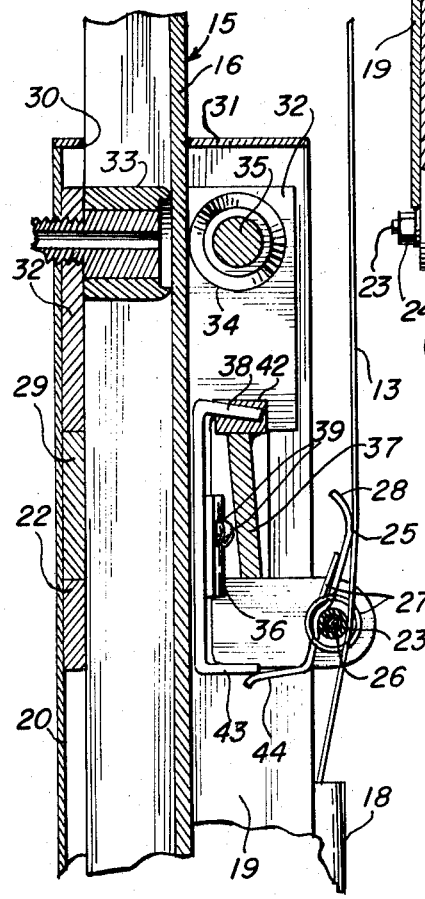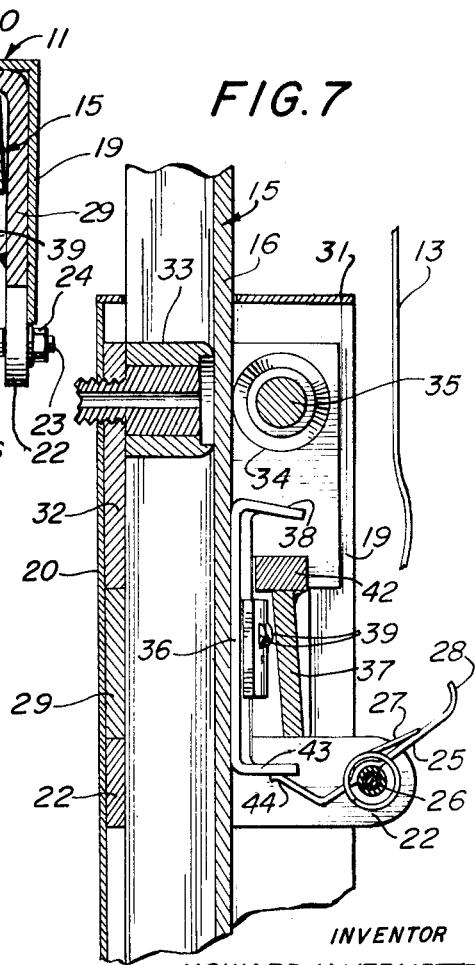

United States Patent Office 3,516,304
Patented June 23, 1970

3,516,304
SAFETY CATCH MECHANISM
Howard H. Vermette, 7 143rd St.,
Hammond Lake, Ind. 46320
Filed Sept. 12, 1968, Ser. No. 759,456
Int. Cl. G05g 5/00; B66b 5/16
U.S. Cl. 74—527                             8 Claims

ABSTRACT OF THE DISCLOSURE

A housing secured to a platform holds an insert, and the housing and insert both slidably engage an upright. The housing and platform are moved vertically on the upright by means of a cable having one end secured to the housing adjacent the front of the housing. The insert has an inner wall surface that is inclined inwardly from its lower edge portion. A vertically disposed retainer, positioned between the inner wall surface of the insert and the upright, holds a plurality of balls in a nonrestraining position that permits free vertical movement of the housing relative to the upright. In its normal position, the retainer is supported with its lower end adjacent the lower end of a pivoted lever. A spring urges the lever to move the retainer upwardly relative to the insert, but under normal conditions the cable engages the upper end portion of the lever to hold it against the force of the spring. If the cable breaks, the force holding the lever against the spring action is released, and the lever moves the retainer upwardly within the insert. The inclined inner surface of the insert forces the balls toward the outer surface of the upright as the retainer is moved upwardly relative to the insert and the upright, and the balls are engaged with the inner wall surface of the insert and the outer surface of the upright. Movement of the housing downwardly relative to the upright then causes the balls to become wedged between the upright and the insert to prevent downward movement of the housing relative to the upright member.

---

This invention relates to a safety catch mechanism, and is particularly concerned with means for preventing a platform, or other object being lifted or lowered by a cable, from falling if the cable breaks. In the normal operation of the device, the cable holds a wedging locking mechanism in inoperative position. If the cable breaks, it releases a spring pressed lever that actuates the wedging locking mechanism to prevent downward movement of the platform or other object being lifted or lowered by the cable.

Suitable structure by means of which the above mentioned and other advantages of the invention are attained will be fully described in the following specification, taken in conjunction with the accompanying drawings showing two preferred embodiments of the invention, in which:

FIG. 4 is a cross sectional view taken in the plane indicated by the line 4—4 of FIG. 3;

FIG. 5 is a cross sectional view taken in the plane indicated by the line 5—5 of FIG. 3;

FIG. 6 is a fragmentary vertical sectional view taken in the plane indicated by the line 6—6 of FIG. 3;

FIG. 7 is a view similar to FIG. 6, but showing the relationship of the parts with the cable broken;

FIG. 9 is a cross sectional view taken in the plane indicated by the line 9—9 of FIG. 8.

Figure 1:
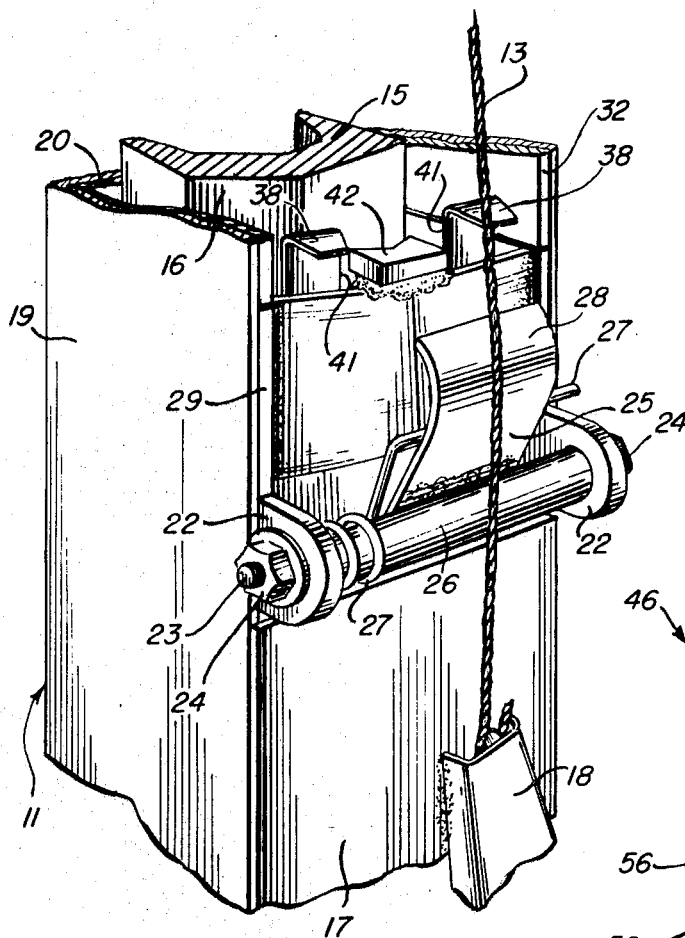
FIG. 1 is a fragmentary perspective view of a safety catch mechanism embodying the invention.

Referring to FIGS. 1 to 7 of the drawings, a vertically disposed housing 11 is secured, in any suitable manner, to each side of a platform 12 that is to be lifted or lowered by cables 13. The housing 11 is preferably tubular, but may have an elongated slot extending longitudinally through one wall of the housing for a reason hereinafter disclosed. The safety catch mechanisms on each side of the platform are duplicates and, therefore, only one will be described. The safety catch mechanism is designed for use with a power lift, but it will be understood that it may be used with any suitable structure. The vertical movement of the housing is guided by an upright member in the form of a channel 15 extending vertically from a suitable frame through the housing. If the upright 15 is long enough to make it desirable to provide support for the upright at any point other than at its bottom, added support may be provided by support brackets extending through a slot that may extend longitudinally through one wall of the housing 11. It is preferred to provide an upright 15 adjacent opposite sides of the platform, but it is possible with proper cantilever structure to use a single upright. With such cantilever construction, only one safety catch mechanism would be provided. The channel is arranged with its base 16 closest to the front wall 17 of the tubular housing. One end of the cable is secured to the housing adjacent the outer surface of its front wall, as indicated at 18, and, in its taut condition, extends upwardly from its securement 18 close to the outer surface of the wall 17.

The front wall 17 is shorter than the side walls 19 and back wall 20 of the housing to provide an opening 21 at the upper portion of the housing. A U-shaped bracket 22 is secured to the inner surfaces of the side and back walls of the housing adjacent the bottom of the opening 21 and projects outwardly beyond the plane of the front wall 17. The outwardly projecting portions of the bracket are apertured, and a bolt 23 extending through the apertures is held in place by a nut 24. A lever 25 is secured intermediate its length to a tubular sleeve 26 rotatably mounted on the bolt 23. A spring 27 urges the lever 25 clockwise, as viewed in FIG. 6, for a purpose hereinafter disclosed. The cable 13 presses against one end portion 28 of the lever 25 to hold it against the spring pressure during the normal operation of the cable system.

The upper edge of the bracket 22 provides a bottom support for a tubular insert 29 that slides into the opening 21 before the housing is mounted on the channel 15. An opening 30 in the rear portion of the top wall 31 of the housing permits the housing to be mounted on the channel with the insert 29 in place. The channel 15 extends through the insert 29 and through the opening 30. A U-shaped bracket 32, secured within the housing 11 in vertically spaced relationship to the bracket 22, engages the upper edges of the back and side walls of the insert 29 to prevent upward movement of the insert relative to the housing. A roller 33 cooperates with a pair of rollers 34 to guide the housing in its vertical movement along the channel 15. The roller 33 rotates on an axis normal to the back wall of the insert 32 and fits in the space between the back wall and the channel 15. The rollers 34 are mounted on a shaft 35 parallel to the back wall and engage the outer surface of the base 16 of the channel.

A ball retainer 36 is mounted between the base of the channel and the front wall 37 of the insert, and is supported in normal operative position by a pair of flanges 38 that extend forwardly to engage the upper edge of the front wall 37 of the insert 29. The inner surface of the front wall 37 is inclined inwardly from its lower edge portion, as shown in FIGS. 6 and 7. The retainer carries a plurality of balls 39 in apertures 40. The apertures are larger than the balls and allow the balls to rotate and move freely within the confines of the apertures. In the normal operative position, the retainer, suspended by the flanges 38, floats between the base of the channel and the inner surface of the front wall 37. In this position, the balls rotate freely in their respective apertures and do not interfere with the vertical movement of the housing 11 relative to the channel 15.

Figure 3:
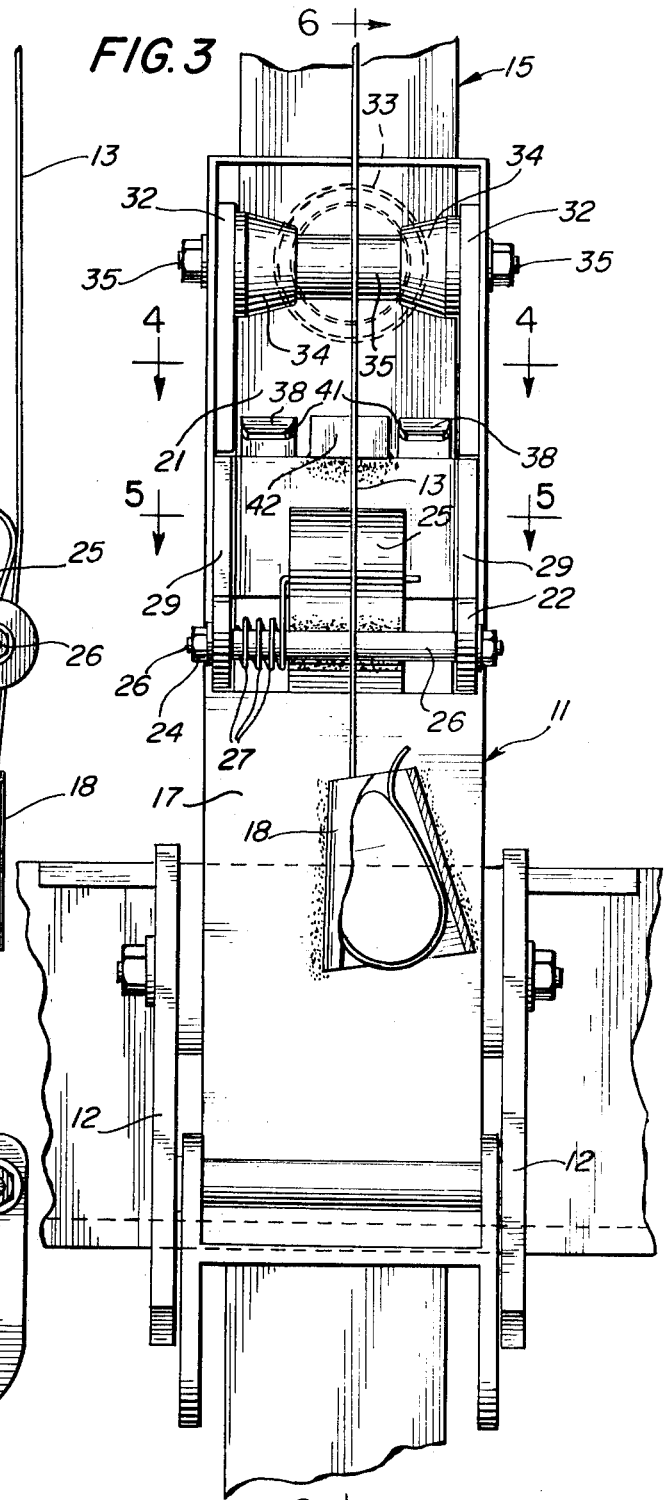
FIG. 3 is a front elevational view of the structure shown in FIG. 2.

The upper portion of the retainer 36 is notched between the flanges 38, as indicated at 41 in FIG. 3. A lug 42 that is welded to the upper edge of the front wall 37 fits in the notch 41 and acts as a spacer during the normal operation of the device to prevent the insert 29 from moving inwardly far enough relative to the retainer 36 to cause the balls 39 to become wedged between the base of the channel and the inclined inner surface of the front wall 37. The retainer 36 has a lip 43 at its lower edge that normally engages the end portion 44 of the lever 25. If the cable 13 breaks, the force holding the spring 27 is released at the same instant the housing 11 starts to fall. The spring pressure forces the lever 25 clockwise, as viewed in FIG. 6, and the end portion 44 of the lever moves the retainer 36, and the balls 39, upwardly.

The upward movement of the retainer 36 under the force of the pivotal movement of the spring pressed lever 25 carries the balls into engagement with the outer surface of the base 16 of the channel 15 and the inner wall surface of the insert 29. Then downward movement of the housing relative to the channel, due to breakage of the cable, causes the balls to become wedged between the inclined inner surface of the front wall 37 of the insert and the base of the channel 15. The wedging action stops the downward movement of the housing relative to the channel and thereby prevents the platform, to which the housing is secured, from falling. The braking action of the balls is substantially instantaneous with the breakage of the cable.

Figure 8:
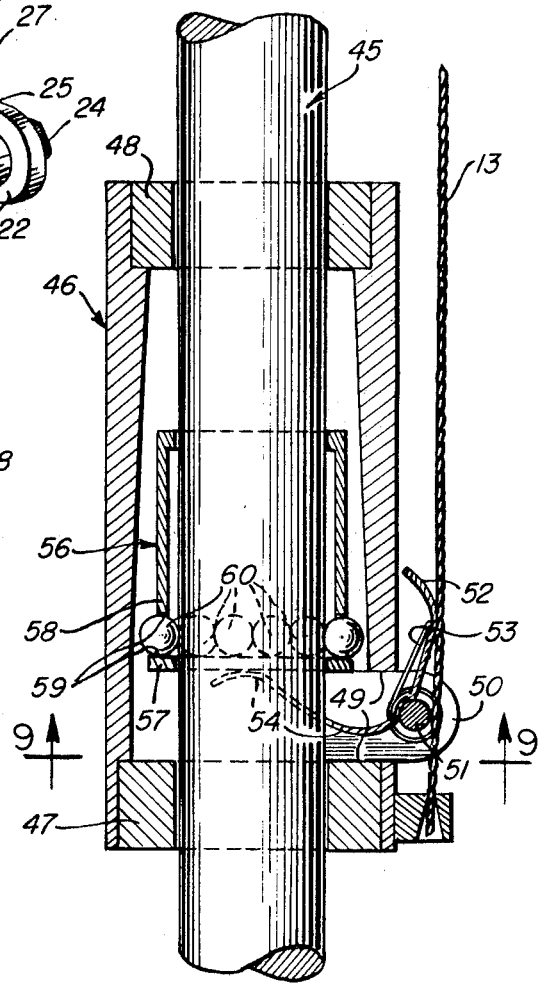
FIG. 8 is a fragmentary vertical sectional view showing another embodiment of the invention.
Figure 2:
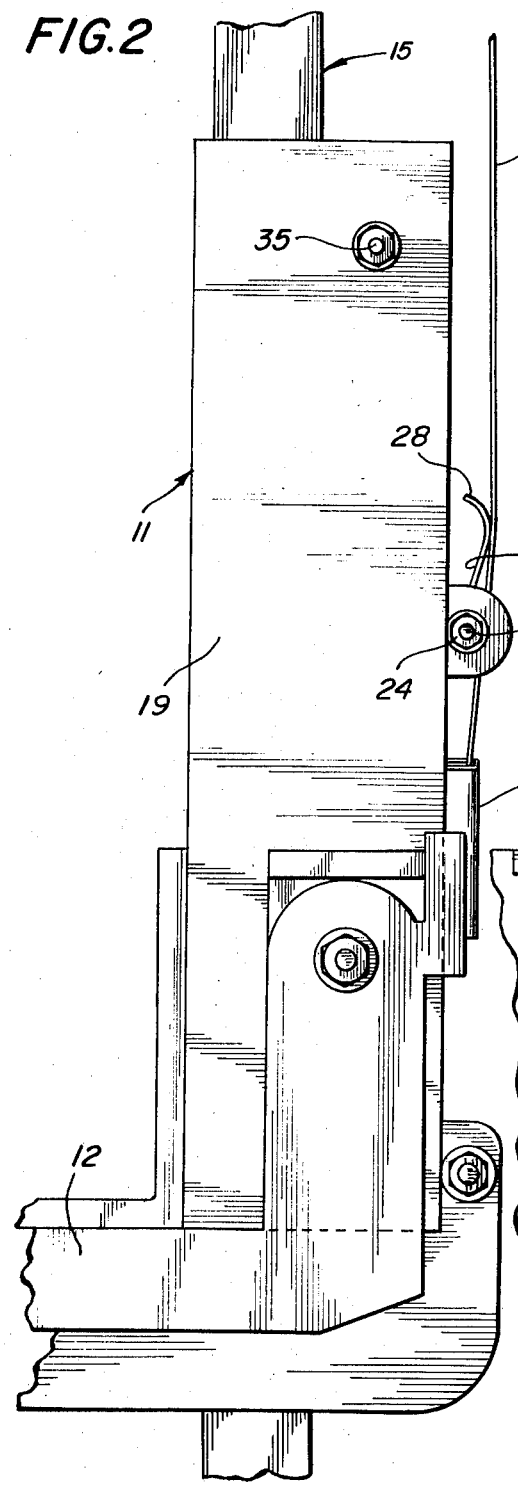
FIG. 2 is a side elevational view of the safety catch mechanism mounted on one side of a platform.

Another embodiment of the invention is disclosed in FIGS. 8 and 9, in which identical structure is indicated by the same reference numerals used in FIGS. 1 to 7. In this embodiment, the channel 15 is replaced by an upright member 45, that may be solid or tubular, and may have any desired cross sectional configuration. The upright member 45 extends upwardly through a tubular housing 46 having a bearing 47 at its lower end and a bearing 48 at its upper end. The housing 46 may be provided with a longitudinal slot to permit the use of support brackets intermediate the length of the upright when the upright is long enough to require additional support. The inner wall surface of the tubular housing is spaced uniformly from the outer surface of the upright at each horizontal cross section but slopes inwardly at a gradual rate from the bearing 47 to the bearing 48. A portion of the wall of the housing is cut away adjacent the bearing 47 to provide an opening 49.

A pair of arms 50 project outwardly from the housing 46 adjacent opposite ends of the opening 49. The arms 50 are apertured to receive a bolt 51 that is adapted to support a lever 52 and a spring 53 similar to the lever 25 and spring 27 of the embodiment of FIGS. 1 to 7. The inner end portion of the lever 52 is bifurcated and its arms 54 and 55 extend into the space between the upright 45 and the housing 46 to encircle a portion of the peripheral surface of the upright.

An annular ball retainer 56 mounted in the space between the upright 45 and the housing 46 comprises an annular base 57 supported on the arms 54 and 55, and a cylindrical wall 58 apertured, as indicated at 59, to receive a plurality of balls 60 spaced uniformly circumferentially of the retainer. The apertures are larger than the diameter of the balls to allow them to rotate and move freely between the peripheral surface of the upright 45 and the tapered inner wall surface of the housing 46. The lever 52 is so shaped that in the normal operative position, in which the cable 13 holds the outer end portion of the lever against the action of the spring 53, the base of the retainer is positioned in a horizontal plane above the upper edge of the opening 49. The free movement of the balls 60 in the apertures 59 permits the housing and ball retainer to move upwardly and downwardly relative to the upright without wedging the balls between the upright and the housing during the normal operation of the device.

The operation of the lever 52 is the same as that of the lever 25. If the cable 13 breaks, the spring 53 moves the lever 52 to lift the annular retainer 56 relative to the upright 45. This upward movement of the retainer carries the balls 60 upwardly into engagement with the upright 45 and tapered inner wall surface of the housing 46. The wedging action, due to the taper of the inner wall surface of the housing 46 causes the ball bearings to lock the housing against downward vertical movement relative to the upright 45. As in the previously described embodiment, the braking action of the balls 60 is substantially instantaneous with the breaking of the cable.

Although two preferred embodiments of the invention have been described in considerable detail, it will be understood that the description thereof is intended to be illustrative, rather than restrictive, as many details of construction may be modified or changed without departing from the spirit or scope of the invention. Accordingly, I do not desire to be restricted to the exact structure described.

I claim:

1. A safety catch mechanism comprising a housing, an upright extending through said housing, a cable secured to said housing for moving it axially of said upright, a locking member supported in nonlocking position between said upright and said housing, a lever pivotally mounted on said housing, opposite end portions engaging one end of said locking member and the peripheral surface of said cable, and a spring exerting a constant pressure against said lever urging it pivotally to move said locking member into engagement with said upright and said housing, whereby said locking member is moved into locking position to prevent downward movement of said housing relative to said upright, said cable normally pressing against the engaged end portion of said lever to hold said lever against the action of the spring and to release said lever for said pivotal movement upon breakage of said cable.

2. A mechanism as recited in claim 1, in which said locking member comprises a retainer member having a plurality of apertures and a ball in each of said apertures, each of said balls being of less diameter than its aperture to permit free rotation of said balls in the nonlocking position of said locking member, and an inner wall surface between said housing and said locking member, said inner wall surface being tapered inwardly in the upward direction and being engaged by said balls as said retainer is moved upwardly relative to said upright and said housing by said lever upon breakage of said cable, whereby said balls become wedged between said upright and said tapered inner wall surface upon breakage of said cable.

3. A mechanism as recited in claim 1 and having an inner wall surface tapered inwardly in the upward direction, said upright comprising a channel with the outer surface of its base closest to said tapered wall surface, said locking member comprising a retainer and a plurality of balls between the base of said channel and said tapered wall surface, said balls being freely rotatable in the nonlocking position of said locking member and being wedged between said upright and said tapered wall surface in the locking position of said locking member.

4. A mechanism as recited in claim 1 and having an inwardly and upwardly tapered wall surface inwardly of said housing, said upright being cylindrical, and said locking member comprising an annular ball retainer having a plurality of circumferentially spaced apertures and balls loosely mounted in said apertures between said inwardly tapered wall surface and said cylindrical upright.

5. A safety catch mechanism comprising a tubular housing and a tubular insert mounted within said housing in axial alignment therewith, said insert having an inner wall surface tapered inwardly from its lower edge portion, an upright extending axially through said housing and insert, a ball retainer positioned between said upright and said tapered inner wall surface, said retainer having a plurality of apertures each holding a ball of smaller diameter than the diameter of its aperture, the normal position of said retainer being such as to permit free rotation of said balls in said apertures, a lever pivotally mounted on said housing, the lower end of said lever being engageable with the lower end of said retainer, a spring urging said lever pivotally to force said retainer upwardly relative to said housing, whereby said balls will become wedged between said upright and said tapered inner wall surface to prevent downward movement of said housing relative to said upright, and a cable secured to said housing for moving said housing vertically relative to said upright, said cable in its normal position pressing against the upper end portion of said lever to hold said lever against said pivotal movement.

6. A mechanism as recited in claim 1, in which said locking member comprises a tubular ball retainer comprising an annular base, an apertured cylindrical wall, and a plurality of balls loosely mounted in the apertures of said cylindrical wall.

7. A mechanism as recited in claim 6, in which the inner wall surface of said housing is tapered inwardly from its lower end to its upper end and said wall is provided with an opening, and a pair of arms projecting outwardly from the wall of said housing adjacent opposite ends of said opening for supporting said lever and said spring.

8. A mechanism as recited in claim 7, in which the inner end of said lever is bifurcated and the bifurcated ends of said lever support said annular base.

References Cited

UNITED STATES PATENTS

| | | | |
|---|---|---|---|
| 321,567 | 7/1885 | Anderson et al. | 187—81 |
| 1,031,637 | 7/1912 | Fischer. | |
| 1,311,050 | 7/1919 | Curry | 187—81 |
| 2,326,046 | 8/1943 | McCormick | 187—88 |
| 2,658,777 | 11/1953 | Rauglas | 287—58 |
| 3,262,520 | 7/1966 | Bond et al. | 187—88 |
| 3,273,671 | 9/1966 | Vrana | 187—88 XR |
| 3,282,383 | 11/1966 | Chasar | 187—88 |
| 3,298,666 | 1/1967 | Prange. | |

FOREIGN PATENTS

| | | |
|---|---|---|
| 10,200 | 4/1913 | England. |
| 19,995 | 10/1911 | England. |

FRED C. MATTERN, Jr., Primary Examiner

F. D. SHOEMAKER, Assistant Examiner

U.S. Cl. X.R.

187—88